(12) United States Patent
Sardi et al.

(10) Patent No.: US 7,540,772 B2
(45) Date of Patent: Jun. 2, 2009

(54) ELECTRICAL CONNECTOR

(75) Inventors: Marco Sardi, Torino (IT); Adriano Plazio, Torino (IT); Fulvio Amerio, Torino (IT); Markus Eckel, Buerstadt (DE); Markus Bahr, Korb (DE); Josef Woller, Griesheim (DE); Wolfgang Maier, Moerfelden-Walldorf (DE)

(73) Assignees: Tyco Electronics AMP Italia S.p.A., Collegno, TO (IT); Tyco Electronics AMP GmbH, Bensheim (DE)

( * ) Notice: Subject to any disclaimer, the term of this patent is extended or adjusted under 35 U.S.C. 154(b) by 0 days.

(21) Appl. No.: 11/777,809

(22) Filed: Jul. 13, 2007

(65) Prior Publication Data

US 2008/0026639 A1 Jan. 31, 2008

(30) Foreign Application Priority Data

Jul. 28, 2006 (EP) .................................. 06425543

(51) Int. Cl.
*H01R 13/64* (2006.01)
(52) U.S. Cl. ..................................................... 439/581
(58) Field of Classification Search ................. 439/581, 439/582, 610, 902
See application file for complete search history.

(56) References Cited

U.S. PATENT DOCUMENTS

| 4,337,989 | A | * | 7/1982 | Asick et al. .................. 439/609 |
| 4,593,960 | A | * | 6/1986 | Millhimes et al. ............ 439/140 |
| 5,990,475 | A | * | 11/1999 | Alegi .......................... 250/239 |
| 5,997,349 | A | | 12/1999 | Yoshioka |
| 6,283,790 | B1 | * | 9/2001 | Idehara et al. ............... 439/582 |
| 6,786,757 | B2 | * | 9/2004 | Pocrass ....................... 439/418 |
| 6,893,291 | B2 | * | 5/2005 | Wendling et al. ............ 439/582 |
| 6,948,977 | B1 | | 9/2005 | Behrent |
| 2002/0173205 | A1 | | 11/2002 | Kato |
| 2004/0169986 | A1 | | 9/2004 | Kauffman |
| 2008/0020645 | A1 | * | 1/2008 | Fuerst et al. .............. 439/620.1 |

FOREIGN PATENT DOCUMENTS

| EP | 0858128 A2 | 8/1998 |
| EP | 1378971 A1 | 1/2004 |

* cited by examiner

*Primary Examiner*—Jean F Duverne
(74) *Attorney, Agent, or Firm*—Barley Snyder LLC

(57) ABSTRACT

An electrical connector having a housing having a body and a plug tip, a cable raceway having a raceway riser configured to receive a cable, the cable raceway being configured for attachment to the body, wherein the plug tip of the housing is angled with respect to a raceway riser when the cable raceway is attached to the body is disclosed.

15 Claims, 5 Drawing Sheets

ELECTRICAL CONNECTOR

CROSS-REFERENCE TO RELATED APPLICATIONS

This application claims the benefit of the filing date under 35 U.S.C. §119(a)-(d) of foreign patent application EP 06 425 543.3 of Jul. 28, 2006.

FIELD OF THE INVENTION

The present invention relates to an electrical connector for an electrical cable, in particular to an angled electrical connector, for transmitting high voltages and high currents to or from a receptacle for the electrical connector, particularly in a motor vehicle.

BACKGROUND

In engineering, particularly in electrical engineering, a large number of electrical connectors and connector receptacles of many different types are known. These serve to transmit electrical power and/or electrical signals with the widest possible range of voltages, currents, frequencies, and data rates. Furthermore, electrical connector and connector receptacle fulfill other functions. For damp, dusty, or chemically aggressive environments, electrical connectors and connector receptacles comprise sealing elements which prevent penetration of the surrounding media into the electrical connector and connector receptacle and corrosion thereof or the formation of conductive deposits therein. Securing elements such as screw threads or latches ensure a secure plug-and-socket connection, even if the plug-and-socket connection is exposed to mechanical tension or vibrations.

Due to the extremely wide range of applications and conditions of use, a wide variety of optimized electrical connectors are available. A relatively new field of use for electrical connectors is the transmission of drive power in an electrically driven motor vehicle. This drive power has to be transmitted between an energy storage means, for example a storage battery or a fuel cell, and a power converter such as a two or four-quadrant chopper and between the latter and the drive motor(s) in one or in both directions. Between the energy storage means and the power converter, the electrical power is transmitted substantially in the form of direct current. Between the power converter and the drive motors, the electrical power is transmitted, for example, as three-phase alternating current. Pulse-width modulation may be used to convert power in the power converter. The AC-voltage and the alternating current component, in particular, on transmission of power between the power converter and the motors, lead to the emission of electromagnetic interference signals which disturb other electrical and electronic systems inside and outside the vehicle. The emission of interference signals is prevented by shielding the conductors through which the electrical power is transmitted. This ensures a so-called electromagnetic compatibility (EMC).

Motor vehicles with an electromotive drive existed until now only in the form of prototypes or short run models. For this reason, the electrical connectors which have been used in the power transmission area are those which are readily available but are distinguished for the most part by a robust but also very complex structure. These connectors are therefore complex and expensive to produce and fit. With electrically driven motor vehicles moving into the realms of series and mass production, the demands placed on the electrical connectors in the power transmission area are also changing. They not only have to be robust and ensure long-term and malfunction-free functioning over the entire life of the motor vehicle, but also have to be simple and cheap to produce and fit. Furthermore, the available space in a vehicle for a high-current electrical connector is often limited so that electrical connectors have to be small in size.

SUMMARY

It is an object of the present invention to provide an electrical connector and an electrical connector arrangement which require little space and are simply in construction and robust in their later application. It is a further object of the present invention to provide an electrical connector and an electrical connector arrangement which are safe with regard to an accumulation of a surrounding media in the electrical connector and the electrical connector arrangement.

The present invention, in one embodiment, relates to an electrical connector having a housing having a body and a plug tip, a cable raceway having a raceway riser configured to receive a cable, the cable raceway being configured for attachment to the body, wherein the plug tip of the housing is angled with respect to a raceway riser when the cable raceway is attached to the body.

BRIEF DESCRIPTION OF THE DRAWINGS

Exemplary embodiments of the present invention are explained in more detail below with reference to the attached drawings in which.

DETAILED DESCRIPTION OF THE EMBODIMENT(S)

In this discussion, an electrical connector is an electrical component which is intended to both be firmly or permanently connected to an electrical cable and to form a connection with a mating component (possibly a detachable plug-and-socket type connection). Hereinafter, the mating component of the electrical connector is referred to as a connector receptacle. The electrical connector is a separate component, which serves to connect the cable with the connector receptacle. The connector receptacle and electrical connector may be incorporated into a housing of any desired apparatus.

Figure 1:
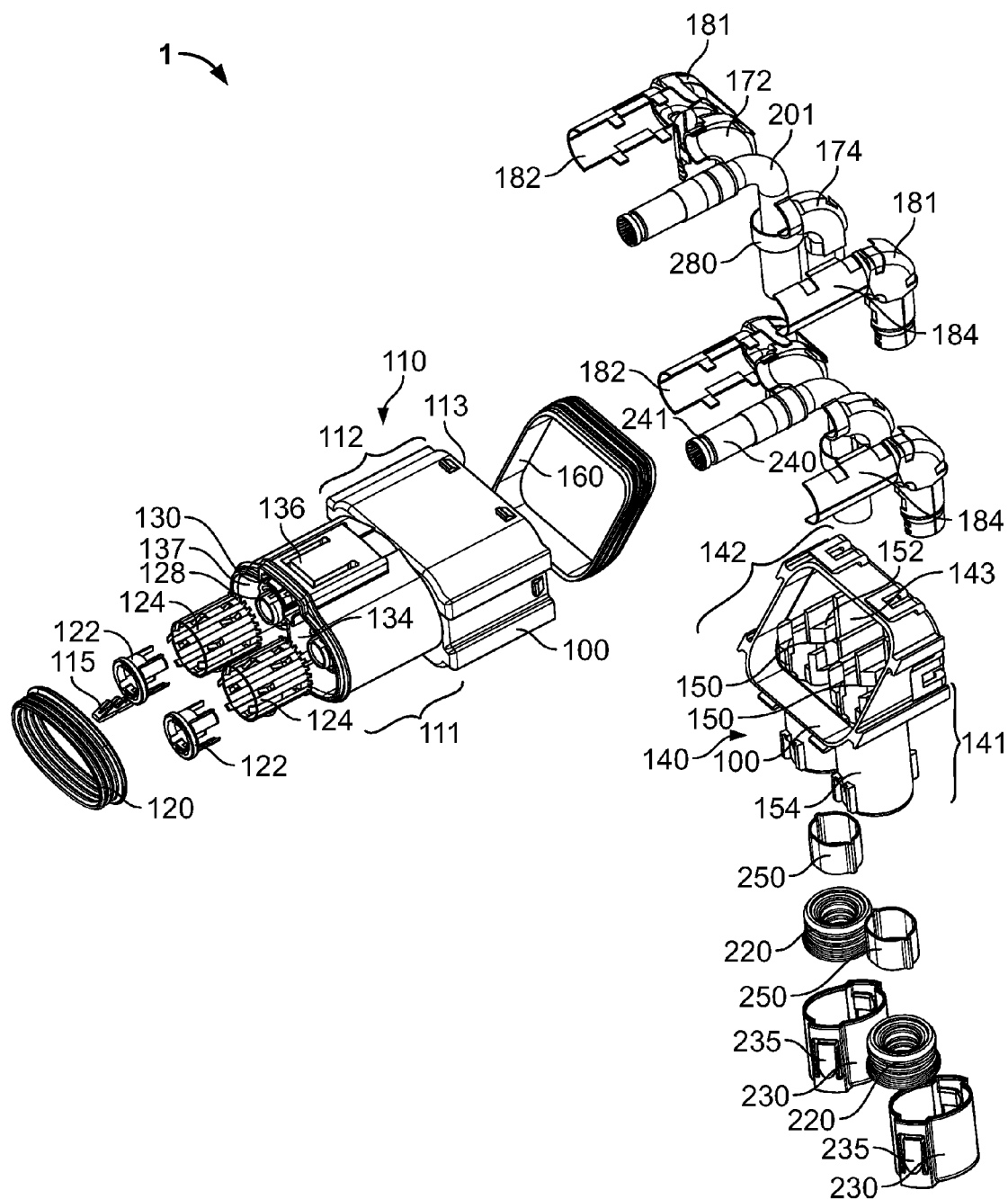
FIG. 1 is an oblique exploded view of an electrical connector according to the present invention.

Referring now to FIG. 1 in the drawings, an electrical connector 1 according to the invention. The electrical connector 1 comprises a housing 100 comprising two parts, a body 110 and a cable raceway 140. The present invention provides the advantage of a small high-current electrical connector 1 for a vehicle, in part, due to its angled configuration. It is possible to electrically connect a hybrid or fuel cell application to the electrical part of a motor of a vehicle, wherein it is possible to transmit voltages up to 500V and currents up to 160 A using the electrical connector 1. An angle of 90° between the tip portion of the prepared electrical cable 2 and a mid-portion of the electrical cable 2 is provided by the electrical connector 1. However, the invention is not limited to an angle of 90°, and any other angle larger than 0° and smaller than 180° is feasible. This applies equally to the configuration of the body 110 (discussed infra) and the cable raceway 140 (discussed infra) so that a plug tip 111 of the body 110 is angled with the above mentioned angles to a raceway riser 141 (discussed infra) of the cable raceway 140. The electrical connector provides the inner conductor element 240 (at least partially) and an end portion of the electrical cable 2 are surrounded by an electromagnetic barrier 180 (discussed infra) for ensuring electromagnetic compatibility.

The body 110 has a plug tip 111 at a front of the electrical connector 1 with respect to a plug-in direction of the electrical connector 1. The plug tip 111 has a generally oval cross-section shaped. A cable receiving area 112 of the body 110 is located at a rear of the electrical connector 1 with respect to the plug-in direction of the electrical connector 1. The cable receiving area 112 comprises a concavity 113 for receiving the cable raceway 140. At least on one side of the body 110, a latch 136 is provided on the plug tip 111 for a latching connection with a corresponding member on a connector receptacle (not shown). Of course, in an alternative embodiment of the present invention, the latch 136 may be carried by the corresponding connector receptacle and the plug tip 111 may be configured for latching connection to the latch 136.

Two insulator sleeves 128 and two support sleeves 130 are provided inside the body 110. One of the insulator sleeves 128 and one of the support sleeves 130 are, in each case, arranged coaxially to one another and connected to one another at a front end visible in FIG. 2, thereby defining annular cavities 135 (see FIGS. 4 and 5) between the coaxially arranged insulator sleeves 128 and support sleeves 130. The support sleeves 130 are surrounded in the plug tip 111 by a cavity 137. A wall 134 is disposed between the two support sleeves 130 in the cavity 137. The body 110 may be constructed integrally with the support sleeves 130 and the insulator sleeves 128.

Shields 124 are generally coaxially associated with the support sleeves 130 within the cavity 137 so that they substantially surround the support sleeves 130. Each of the shields 124 comprises a substantially tubular sheet metal element with outwardly directed outward contacts 126 distributed evenly around its circumference preferably in the vicinity of its front edge. The outward contacts 126 contact shield elements of the connector receptacle (not shown) when the electrical connector 1 is connected with the connector receptacle. Each shield 124 additionally comprises a plurality of inwardly directed inward contacts 125 (discussed infra) that are distributed evenly over its circumference. At least one resilient protrusion 127 in/at the shields 124 is provided for holding the shields 124 in place on the support sleeves 130. Alternatively, the electrical connector 1 does not comprise any shield 124, but rather, merely one or more openings in the support sleeve 130. In that case, one or more contact elements attached to the electromagnetic shielding, in particular constructed integral therewith, may pass through these openings in order to contact the shield element of the connector receptacle (not shown) when the electrical connector 1 is connected thereto. Further, the shield element of the connector receptacle may pass through these openings in order to contact the shield element of the electrical connector 1.

A connector seal 120 is provided for insertion into the cavity 137 (see FIG. 5) behind the shields 124 to protect the inside of the electrical connector 1 and the connector receptacle from environmental influences when the electrical connector and the connector receptacle are connected together.

Two shielded electrical cables 2 (see FIGS. 4 and 5) are provided for insertion into the housing 100 of the electrical connector 1. A cable seal 220 and a cap 230 are drawn over each of the electrical cables 2. An inner conductor element 240 is crimped or otherwise electrically connected to an inner conductor 284 of each of the electrical cables 2. Each of the inner conductor elements 240 has an opening at its front end to accommodate and electrically contact a contact pin of the connector receptacle (not shown) when the electrical connector 1 is connected to the connector receptacle. For a better electrical contact between contact pins of the connector receptacle and the inner conductor elements 240, each of the latter preferably comprises a spring sleeve 242 inside at a front end. In an alternative embodiment, the inner conductor elements 240 may be formed as pin contacts at their front portion, while the mating electrical contacts in the connector receptacle are socking contacts.

Figure 5:
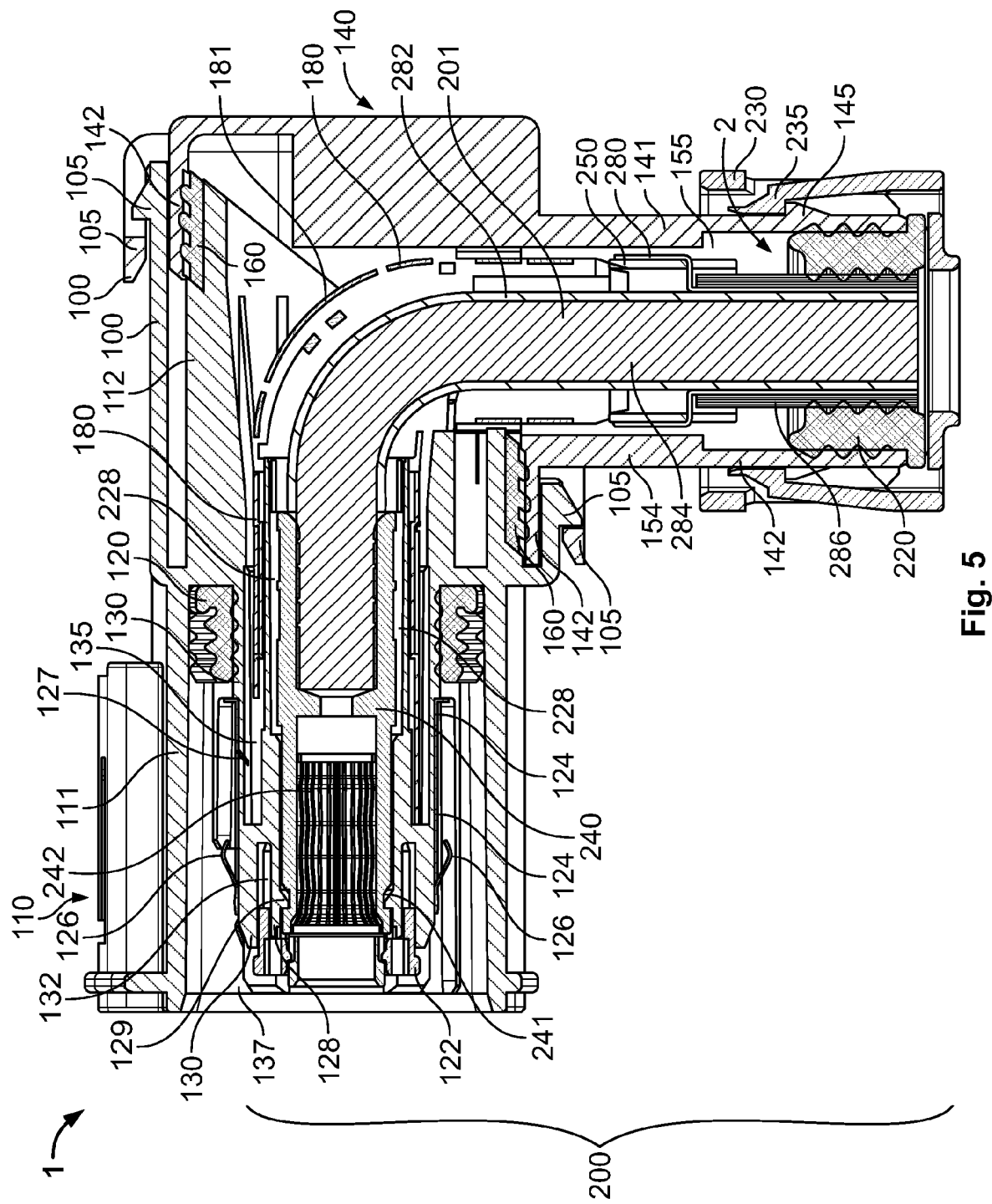
FIG. 5 is another orthogonal cross-sectional view of the electrical connector of FIG. 1.

An electromagnetic barrier 180 is connected to an exposed portion of a shielding conductor 280 of each of the electrical cables 2 (see FIGS. 1 and 5). The inner conductor elements 240 of electrical cables 2 and the electromagnetic barrier 180 are arranged coaxially to one another. When they, together with the cable raceway 140, are introduced into the body 110, the insulator sleeve 128 is accommodated in a tubular cavity 228 between the inner conductor element 240 and the electromagnetic barrier 180.

Figure 2:
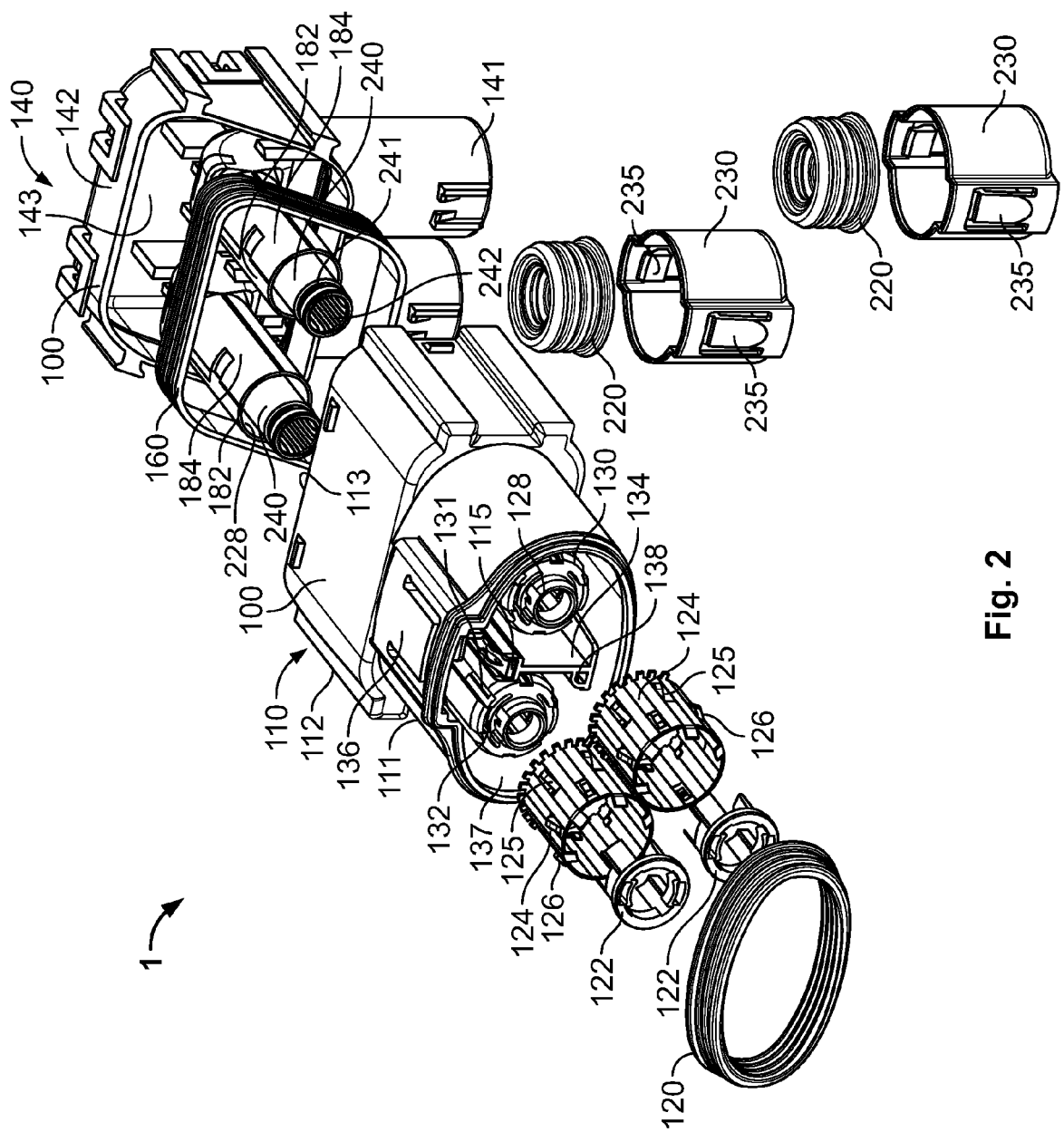
FIG. 2 is an oblique partially exploded view of the electrical connector of FIG. 1.

At the front end, each of the inner conductor elements 240 comprises a groove 241 in its outer circumference, in which a tab 129 (FIG. 5) engages when the inner conductor element 240 has been fully plugged into the body 110 of the electrical connector 1. This connection between the inner conductor elements 240 and the body 110 may be locked together by securing elements 122 (FIG. 1 and 2). The securing elements 122 catch in the electrical connector 1 or in a recess 132. The recess 132 is located between the insulator sleeve 128 and the support sleeve 130 in a front end of the plug tip 111.

Figure 4:
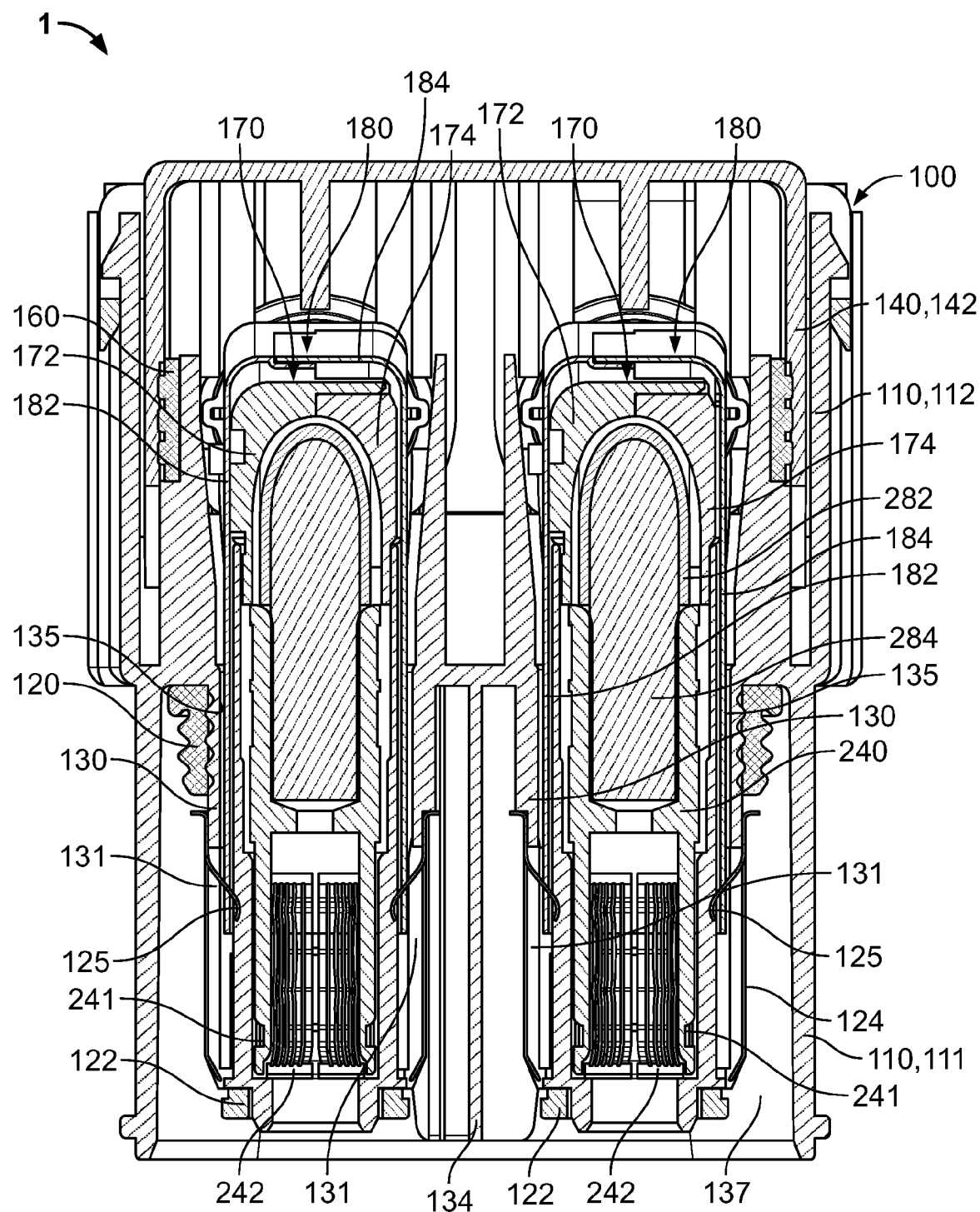
FIG. 4 is an orthogonal cross-sectional view of the electrical connector of FIG. 1.

Specifically, FIGS. 4 and 5 make it particularly clear how the insulator sleeve 128 is located between the inner conductor element 240 and the electromagnetic barrier 180. It can also be seen how the support sleeve 130 is located between the electromagnetic barrier 180 and the shield 124. The inward contacts 125 of the shield 124 project through apertures 131 in the support sleeve 130 and contact the electromagnetic barrier 180.

Further, FIG. 5 shows that cable seals 220 are held by caps 230 in a raceway riser 141 of the cable raceway 140 in spaces between the raceway riser 141 and the electrical cables 2. Furthermore, the cap 230 is held in place by a catch connection between two mutually opposing catch springs 235 and corresponding catch elements 145 of the cable raceway 140. In addition, the shielding conductor 280 of the electrical cable 2 is turned out, and up or down and compressed between a crimping sleeve 250 and the electromagnetic barrier 180. It can additionally be seen how the resilient protrusion 127 of the shield 124 engages in a corresponding opening in the support sleeve 130 in order to hold the shield 124 on the support sleeve 130. The outward contacts 126 may produce an electrically conductive connection between the shield 124 of the electrical connector 1 and the shield element of the connector receptacle (not shown). The tabs 129 engage in the groove 241 in the inner conductor element 240. The securing element 122 locks this catch connection by filling the recess 132 between the tabs 129 and the support sleeve 130, preventing deflection of the tabs 129 which could otherwise result in release of the connection.

Figure 3:
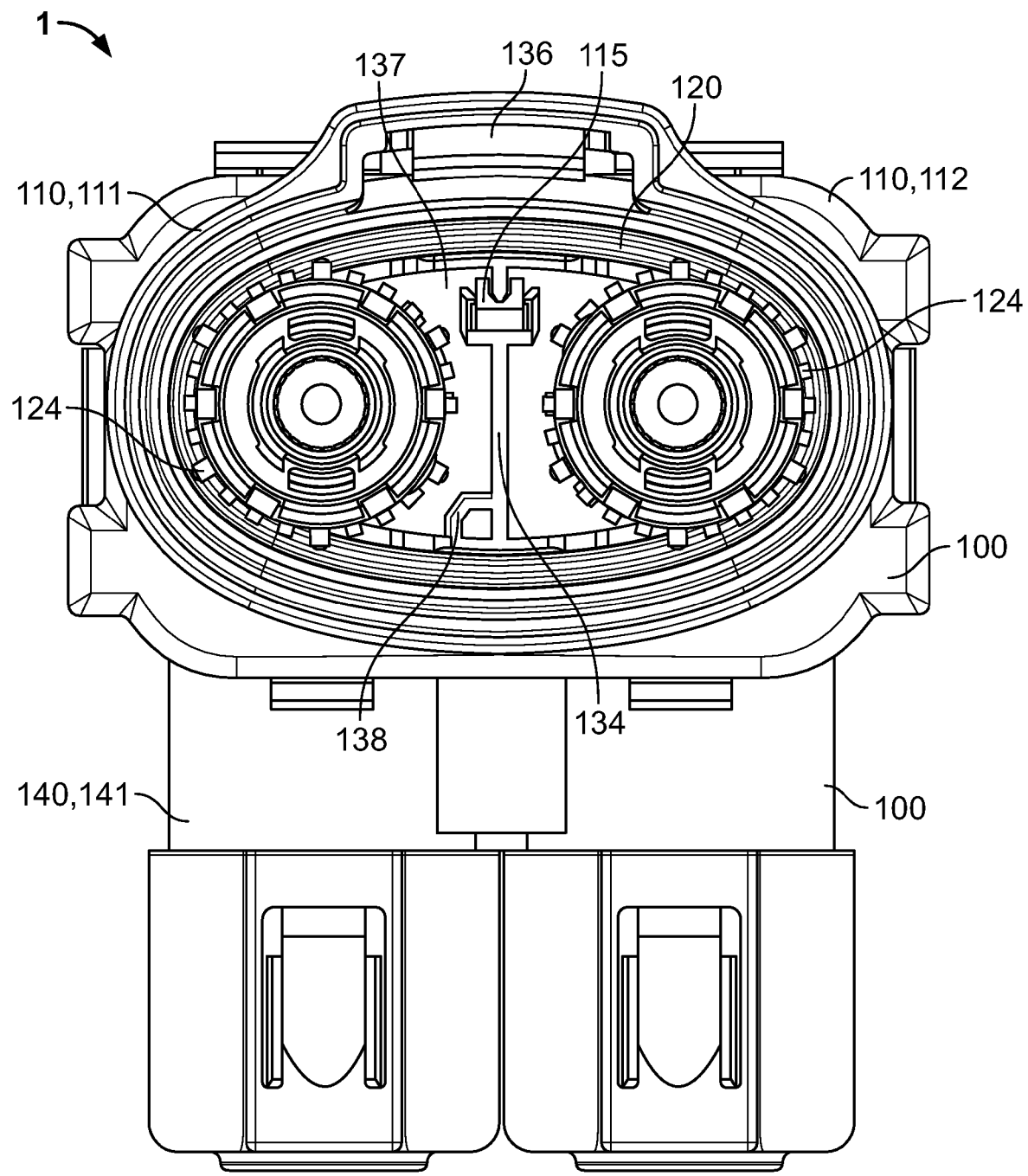
FIG. 3 is an orthogonal front view of the electrical connector of FIG. 1.

FIGS. 1 to 3 show a resilient signal contact 115 mounted in the electrical connector 1, which short-circuits upper ends of short-circuit contacts of the connector receptacle (not shown) when the electrical connector 1 is connected with the connector receptacle. Furthermore, FIGS. 2 and 3 show a coding 138 at the wall 134 opposite the signal contact 115 for the receptacle of the electrical connector 1. This coding 138 is optional and may also be provided by the securing elements 122.

In particular, a coding function is achieved solely by shaping the securing elements 122. The coding function ensures that specific electrical connectors 1 match and may only be mated with only specific connector receptacles (not shown). To achieve the coding, it is not necessary that the entire body 110 specially conform to the connector receptacle. Instead, as few as one of the securing elements 122 may ensure the coding function. This allows parts 110, 140 of the housing 100 to be produced in large numbers and yet allows different coding and use with differently coded connector receptacles (not shown). The securing element 122 may be easily produced in different shapes and in smaller numbers than the parts 110, 140. Further, mold conversion kits for the various coding configurations have to be introduced only into the smaller, relatively simple mold for producing the securing element 122 rather than the parts 110, 140. Subsequently, securing elements 122 may be selected from the plurality of different securing elements 122 which exclusively match the connector receptacle to be connected with the electrical connector 1. For example, a specific coding may be ensured by specially shaping a securing element 122 in a manner designated as a coding for connecting an electrical cable 2 to an energy source and a power converter. Similarly, a specific coding may be ensured by specially shaping a securing element 122 in a manner designated as a coding for connecting an electrical cable 2 to a power converter and a drive motor. The securing element 122 locks the inner conductor element 240 with the electrical connector 1 inside the insulator sleeve 128. This securing element 122 is constructed such that it can only adopt its intended position when the inner conductor element 240 is held together with the electrical connector 1 as intended by a latch connection.

As mentioned above, the housing 100 of the electrical connector 1 comprises two parts, the body 110 and the cable raceway 140, providing an angled electrical connector 1. Hereby, a longitudinal extension of the cable raceway 140 is angled with respect to a longitudinal extension of the body 110. In this embodiment, this angle is about 90°, but any other angle may be appropriate and may be used in alternative embodiments of the present invention. As best seen in FIGS. 1 and 2, the cable raceway 140 may be attached at or preferably partially inserted into the body 110. In an alternative embodiment, the body 110 may be formed to be attached or partially inserted into the cable raceway 140.

In a pre-assembled state of the electrical connector 1, the prepared electrical cable 2 (provided with the inner conductor element 240 and the electromagnetic barrier 180) is placed in the cable raceway 140 (see FIG. 2), so that the prepared electrical cable 2 is received in a receptacle 150 of the cable raceway 140. The electromagnetic barrier 180 of the electrical cable 2 rests on a seat 152 of the receptacle 150, so that each electrical cable 2 extends through a tube 154 attached at the lower side of the cable raceway 140. The tubes 154 form a raceway riser 141 of the cable raceway 140. The tube 154 is hollow and comprises a hole 155 through which the electrical cable 2 extends. After attaching the prepared cable end 200 of the electrical cable 2 in the cable raceway 140, the cable raceway 140 may be inserted into the body 110. An angled seal 160 (see also FIGS. 4 and 5) is provided between the body 110 and the cable raceway 140. The angled seal 160 is adapted to the form of an inclined opening 143 (see below) of the cable raceway 140, i.e. a frame-like seal is displaced at two opposite sides in parallel. After attaching the cable raceway 140 to the body 110, corresponding locking elements 105 hold the cable raceway 140 in place with respect to the body 110. In this embodiment, six of these corresponding locking elements 105 are provided, two on the top side, two on the bottom side, and one on both lateral sides. The corresponding locking elements 105 of the cable raceway 140 are formed as latches and of the body 110 are formed as hooks. In alternative embodiments, the locking elements 105 of the cable raceway may be formed as hooks and the locking elements 105 of the body 110 may be formed as latches.

The opening 143 of the cable raceway 140, from which the tip portions of the electrical cables 2 protrude, is inclined with respect to an inserting direction (plane) of the cable raceway 140 into the body 110. This arrangement allows easy mounting of the prepared electrical cable 2. By providing the receptacle 150 with its seat 152 and the inclined opening 143 of the cable raceway 140, the tip portion 200 of the electrical cable 2 is both easily inserted into the cable raceway 140 and easily accessible by the body 110. An upper edge of the inclined opening 143 is located above a rear portion of the holes 155 (rear means an opposite direction of the plug-in direction of the electrical connector 1 into the connector receptacle). Due, in part, to the inclined opening of the cable raceway 140, it is possible to easily place the inner conductor element 240 and the electromagnetic barrier 180 into the cable raceway 140 before its assembly with the body 110.

In order to provide electrical connector 1 with an angle, turn, or, bend, the tip portion 200 of the prepared electrical cable 2 is bent. In a first embodiment of the invention (shown in the drawings), the electrical cable 2 itself comprises an inner conductor bend 201. In a second embodiment of the invention (not shown), the inner conductor element 240 attached to the inner conductor 284 of the electrical cable 2 is bent. In that second embodiment, a receiving portion (that receives the inner conductor 284) of the inner conductor element 240 is angled with respect to a plug-in portion (that receives the contact pin of the connector receptacle may be inserted or onto which a socket plug may be installed).

In the following, only the first embodiment of the present invention is further explained. The second embodiment of the invention functions analogously. As can best be seen from FIG. 4 and 5, the inner conductor 284 of the electrical cable 2 is mounted, possibly by crimping, in a rear portion of an inner conductor element 240. An electrical insulation 282 of the electrical cable 2 is joined to the rear of the inner conductor element 240. After that, the electrical cable 2 is bent about 90° while the adjacent shielding conductor 280 of the electrical cable 2 rests on a crimping sleeve 250. A cable jacket 286 covers the shielding conductor 280 of the electrical cable 2.

Almost the complete length of the inner conductor element 240 (except for a small tip portion), the bent portion of the electrical cable 2, and the crimping sleeve 250 with its shielding conductor 280 are electromagnetically shielded by the electromagnetic barrier 180. The electromagnetic barrier 180 comprises a first barrier piece 182 and a second barrier piece 184. It is also possible to design the electromagnetic barrier 180 from more than two parts. Each piece 182, 184 of the electromagnetic barrier 180 is designed as a half-shell which may be crimped together. The electromagnetic barrier 180 may be crimped in a portion covering the inner conductor element 240 and/or in a barrier bend 181 of the electrical cable 2 and/or at a tip portion of the electromagnetic barrier 180 lying opposite to the inner conductor element 240. The tip portion fastens the shielding conductor 280 of the electrical cable 2 to the crimping sleeve 250. This arrangement provides a continuous electrical shielding between the shielding conductor 280 of the electrical cable 2 through the electromagnetic barrier 180 to a shield 124 which may be contacted by a shield element of a receptacle for the electrical connector 1. Accordingly, the shield element of the receptacle electrically contacts the shield 124 of the electrical connector 1, so that a complete electromagnetic shielding is provided between the electrical cable 2 and an electrical connection inside the connector receptacle.

A plastic guide 170 guides and supports the electrical cable 2 (or the inner conductor element 240 in the second embodiment of the invention) between the electromagnetic barrier 180 and the electrical cable 2. The guide 170 comprises a first guide member 172 and a second guide member 174 which may be combined to form the guide 170. The guide 170 extends mainly in the bent portion of the electrical cable 2 (or in the bent portion of the inner conductor element of the second embodiment of the invention). Furthermore, the guide 170 supports the first barrier piece 182 and the second barrier piece 184 during crimping of the first barrier piece 182 and the second barrier piece 184 of the electromagnetic barrier 180. The guide helps to avoid problems of incorrect alignment of the electromagnetic barrier 180 and the electrical cable 2 and/or the inner conductor element 240. The guide may be constructed of plastic or other suitable materials.

In the following, the assembly of the electrical connector 1 for an electrical cable 2 is described.

In a first step, the caps 230 and the cable seals 220 are installed onto the electrical cable 2 and the inner conductor elements 240 are connected with the bare (and, if applicable, rightly cut) inner conductors 284 of all the electrical cables 2. The mechanical and electrical connections between the inner conductor elements 240 and the inner conductors 284 may be achieved by crimping.

In a second step, the parts 172, 174 of the guide 170 are placed into the pieces 182, 184 of the electromagnetic barrier 180. The electromagnetic barrier is placed around the electrical cable 2 (or the inner conductor element 240 in the second embodiment of the invention). Further, the pieces 182, 184 of the electromagnetic barrier 180 are connected with the exposed shielding conductor 280 of each of the electrical cables 2. This is may be accomplished by crimping the two pieces 182, 184 together.

In a third step, the electrical cables 2 are placed through the inclined opening 143 into the cable raceway 140 so that the inner conductor bends 201 are disposed on the seats 152 of the receptacles 150.

In a fourth step, the pre-mounted cable raceway 140 is moved adjacent to/into the body 110 so that the insulator sleeves 128 are each inserted between inner conductor elements 240 and electromagnetic barriers 180, into cavity 228. The electrical cables 2 are inserted with their attached inner conductor elements 240 and their electromagnetic barriers 180 in the body 110 so that the inner conductor elements 240 and the electromagnetic barriers 180 are located in the electrical connector 1. During placement of the inner conductor elements 240 and the electromagnetic barriers 180 in the body 110, the corresponding locking elements 105 engage into each other.

In an optional fifth step, specific securing elements 122 are selected from a plurality of differently shaped securing elements 122 to match the electrical connector 1 to specific connector receptacles. This step may alternatively occurs before step four.

In a sixth step, the securing elements 122 are connected to the electrical connector 1 and the inner conductor elements 240 are locked in the electrical connector 1.

The second step (described above) of connecting the electromagnetic barrier 180 with the exposed shielding conductor 280 may comprise the following steps. First, determining the diameter of the shielding conductor 280 of the electrical cable 2. Next, selecting the internal or external crimping sleeve 250 (FIG. 1) with a suitable diameter depending on this diameter. Next, using the two pieces 182, 184 of the electromagnetic barrier 180 and the selected crimping sleeve 250 for crimping so that the exposed shielding conductor 280 of the electrical cable 2 is attached to the crimping sleeve 250 and the electromagnetic barrier 180. This procedure has the advantage that the same electromagnetic barrier 180 may be used for electrical cables 2 having different diameters.

Further advantages of the present invention are that it considerably simplifies and reduces the price of construction and fitting of the electrical connector 1, and at the same time provides the electrical connector 1 with excellent mechanical and electrical properties. In addition to use for electrical transmission of drive power in vehicles, the present invention is also suitable for other applications in motor vehicles or in other fields of use.

What is claimed is:

1. An electrical connector, comprising:
a housing having a body and a plug tip;
a cable raceway having a raceway riser configured to receive a cable, the cable raceway being configured for attachment to the body;
an opening of the cable raceway for receiving the cable;
a concavity of the housing for receiving a tip portion of the cable;
wherein a plane of the opening is inclined with respect to a plane of a concavity of the body, and the plug tip of the housing is angled with respect to a raceway riser when the cable raceway is attached to the body.

2. The electrical connector according to claim 1, further comprising:
a wall dividing a cavity of the plug tip.

3. The electrical connector according to claim 1, wherein the plug tip accommodates at least one inner conductor element electrically connected to the cable and wherein the inner conductor element is substantially surrounded by an electromagnetic barrier.

4. The electrical connector according to claim 3, wherein the electromagnetic baffler of the electrical connector is electrically connected to a shielding conductor of the cable and wherein the electromagnetic barrier substantially surrounds the electrical connection of the cable and the inner conductor element.

5. The electrical connector according to claim 4, wherein a cable seal of the cable is accommodated in the housing and wherein the electromagnetic barrier includes a first barrier piece and a second baffler piece for shielding an inner conductor bend of the cable.

6. The electrical connector according to claim 5, wherein the electromagnetic barrier is divided into the first barrier piece and a second baffler piece to form a baffler bend of the electromagnetic barrier.

7. The electrical connector according to claim 5, wherein the electromagnetic barrier is divided in at least two parts over the length of the electromagnetic baffler extending from its electrical connection with the cable to near a tip end of the inner conductor element.

8. The electrical connector according to claim 7, wherein a guide is disposed between the electromagnetic barrier and the cable and wherein the guide guides the inner conductor element within the electromagnetic barrier.

9. The electrical connector according to claim 7, wherein a guide is disposed between the electromagnetic barrier and the inner conductor element and wherein the guide guides the inner conductor element within the electromagnetic barrier.

10. The electrical connector according to claim 7, wherein the guide is divided in into a first guide member and a second guide member and wherein a parting plane of the first guide member and the second guide member lies substantially coplanar with a parting plane of the first baffler piece and the second barrier piece.

11. The electrical connector according to claim 10, wherein the first baffler piece and the second baffler piece are crimped together and each of the first guide member and the second guide member are located in a baffler bend of the electromagnetic barrier.

12. The electrical connector according to claim 10, wherein the cable raceway is partially insertable into the housing.

13. The electrical connector according to claim 10, further comprising:
   an insulator sleeve extending from the plug tip to a cable receiving area of the body and configured to receive the cable into the insulator sleeve from the cable receiving area; and
   a support sleeve that substantially surrounds the insulator sleeve, the support sleeve being mechanically connected to the insulator sleeve in the plug tip and mechanically connected to the body in the cable receiving area;
   wherein an annular cavity between the insulator sleeve and the support sleeve receives a tip portion of the electromagnetic barrier.

14. The electrical connector according to claim 13, further comprising:
   a shield having an outward contact, the shield being carried on the support sleeve; and
   an aperture in the support sleeve configured to allow an inward contact of the shield to project through the aperture and electrically contact the electromagnetic barrier.

15. The electrical connector according to claim 4, wherein an angled inner conductor element may be accommodated in the housing, the electromagnetic barrier includes a first barrier piece and a second barrier piece for shielding an inner conductor bend of the cable, and the cable extends in a substantially straight line away from a mounting portion of the inner conductor element.

* * * * *

UNITED STATES PATENT AND TRADEMARK OFFICE
CERTIFICATE OF CORRECTION

| | | |
|---|---|---|
| PATENT NO. | : 7,540,772 B2 | Page 1 of 1 |
| APPLICATION NO. | : 11/777809 | |
| DATED | : June 2, 2009 | |
| INVENTOR(S) | : Marco Sardi et al. | |

It is certified that error appears in the above-identified patent and that said Letters Patent is hereby corrected as shown below:

In column 8, line 43, "the electromagnetic baffler" should read --the electromagnetic barrier--.
In column 8, line 51, "and a second baffler piece" should read --and a second barrier piece--.
In column 8, line 55, "and a second baffler piece to form a baffler bend" should read --and a second barrier piece to form a barrier bend--.
In column 8, line 59, "the electromagnetic baffler extending" should read --the electromagnetic barrier extending--.

In column 9, line 7, "the first baffler piece" should read --the first barrier piece--.
In column 9, line 10, "the first baffler piece and the second baffler piece" should read --the first barrier piece and the second barrier piece--.
In column 9, line 12, "located in a baffler bend" should read --located in a barrier bend--.

Signed and Sealed this

Third Day of November, 2009

David J. Kappos
*Director of the United States Patent and Trademark Office*